(12) United States Patent
Yamasaki et al.

(10) Patent No.: US 8,794,395 B2
(45) Date of Patent: Aug. 5, 2014

(54) ELECTRIC LINEAR MOTION ACTUATOR AND ELECTRIC DISC BRAKE ASSEMBLY

(75) Inventors: Tatsuya Yamasaki, Iwata (JP); Masaaki Eguchi, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/498,345

(22) PCT Filed: Sep. 13, 2010

(86) PCT No.: PCT/JP2010/065728
§ 371 (c)(1),
(2), (4) Date: Mar. 29, 2012

(87) PCT Pub. No.: WO2011/040217
PCT Pub. Date: Apr. 7, 2011

(65) Prior Publication Data
US 2012/0181137 A1 Jul. 19, 2012

(30) Foreign Application Priority Data

Sep. 29, 2009 (JP) ................................ 2009-224106
Sep. 29, 2009 (JP) ................................ 2009-224606

(51) Int. Cl.
*F16D 55/08* (2006.01)
*F16H 1/24* (2006.01)
*F16H 57/02* (2012.01)

(52) U.S. Cl.
USPC ................. 188/72.1; 74/424.92; 74/606 R

(58) Field of Classification Search
USPC ................. 188/156, 158, 72.1, 72.8, 72.7;
74/424.91, 424.92, 606 R, 89.23–89.45;
192/84.6
See application file for complete search history.

(56) References Cited

U.S. PATENT DOCUMENTS

| 6,554,109 B1 | 4/2003 | Olschewski et al. |
| 2008/0110704 A1* | 5/2008 | Nakazeki ............... 188/158 |

(Continued)

FOREIGN PATENT DOCUMENTS

| JP | 06-327190 | 11/1994 |
| JP | 2002-520545 | 7/2002 |

(Continued)

OTHER PUBLICATIONS

English translation of the Written Opinion of the International Searching Authority issued Oct. 26, 2010 in PCT/JP2010/065728.

(Continued)

*Primary Examiner* — Vishal Sahni
(74) *Attorney, Agent, or Firm* — Wenderoth, Lind & Ponack, LLP.

(57) ABSTRACT

In an electric linear motion actuator, it is proposed to uniformly distribute external thrust loads to respective planetary rollers while the planetary rollers are revolving around a rotary shaft while rotating about their respective axes with a helical rib of an outer ring member in engagement with circumferential grooves of the respective planetary rollers. The planetary rollers have bearing support surfaces on which thrust bearings are supported, respectively. The distance from the bearing support surface of each planetary roller to a predetermined reference position of each circumferential groove (6a) of the planetary roller is different from the corresponding distances for the other planetary rollers, whereby with the planetary rollers supported by the respective thrust bearings, the axial position of each circumferential groove coincides with the axial position of the portion of the helical rib of the outer ring member that is engaged in the circumferential groove.

16 Claims, 14 Drawing Sheets

(56) References Cited

U.S. PATENT DOCUMENTS

| | | | |
|---|---|---|---|
| 2009/0095579 A1* | 4/2009 | Yamasaki | 188/72.7 |
| 2010/0084230 A1* | 4/2010 | Yamasaki et al. | 188/162 |
| 2010/0320043 A1 | 12/2010 | Yamasaki et al. | |

FOREIGN PATENT DOCUMENTS

| | | |
|---|---|---|
| JP | 2003-343620 | 12/2003 |
| JP | 2006-194356 | 7/2006 |
| JP | 2007-032717 | 2/2007 |
| JP | 2007-120658 | 5/2007 |
| JP | 2007-127205 | 5/2007 |
| JP | 2009-197863 | 9/2009 |
| JP | 2010-065777 | 3/2010 |

OTHER PUBLICATIONS

Japanese Office Action, issued Jun. 18, 2013 in JP 2009-224106, which is a counterpart to the present application (with partial English translation).

Japanese Office Action, issued Jun. 18, 2013 in JP 2009-224606, which is a counterpart to the present application (with partial English translation).

International Search Report issued Oct. 26, 2010 in International (PCT) Application No. PCT/JP2010/065728.

* cited by examiner

ELECTRIC LINEAR MOTION ACTUATOR AND ELECTRIC DISC BRAKE ASSEMBLY

TECHNICAL FIELD

This invention relates to an electric linear motion actuator for converting the rotary motion of an electric motor to a linear motion, thereby linearly driving a driven member, and an electric disc brake assembly including such an electric linear motion actuator.

BACKGROUND ART

Known electric linear motion actuators of this type include a ball screw mechanism or a ball-ramp mechanism as a motion converter mechanism for converting the rotary motion of an electric motor to a linear motion.

A ball screw mechanism or a ball-ramp mechanism can increase power to a certain extent when power is transmitted through threads having a lead angle or inclined cam surfaces, of the motion converter mechanism. But these conventional mechanisms cannot increase power to such an extent as required in e.g. an electric disc brake assembly.

JP Patent Publication 6-327190A discloses an electric linear motion actuator including one of the above-mentioned motion converter mechanisms and further including planetary gear speed reduction mechanism to increase the driving force. The addition of such a speed reduction mechanism tends to increase the size of the electric linear motion actuator, making it difficult to compactly design the electric linear motion actuator.

In order to avoid these problems, the inventors of the present application have proposed, in JP Patent Publication 2007-32717A, an electric linear motion actuator which ensures a sufficiently large power increase function without the need to mount a speed reduction mechanism, which is relatively small in linear motion stroke, and which is suitable for use in an electric disc brake assembly.

The electric linear motion actuator disclosed in JP Patent Publication 2007-32717A comprises a housing, an outer ring member mounted in the housing and formed with a helical rib on a radially inner surface of the outer ring member, a rotary shaft mounted coaxially with the outer ring member and configured to be rotated by an electric motor, a carrier supported by the rotary shaft so as to be rotatable about the rotary shaft, and a plurality of planetary rollers mounted between a radially outer surface of the rotary shaft and the radially inner surface of the outer ring member and rotatably supported by the carrier, the planetary rollers being in frictional contact with the rotary shaft and each having a plurality of circumferential grooves arranged with the same pitch as the pitch of the helical rib and meshing with the helical rib, the linear motion actuator being configured such that when the rotary shaft rotates, the planetary rollers revolve around the rotary shaft while rotating about axes of the respective planetary rollers due to frictional contact between the planetary rollers and the rotary shaft, and the carrier is moved linearly in an axial direction of the rotary shaft due to meshing engagement between the helical rib and the circumferential grooves, thereby linearly driving a driven member.

The inventors of the present application also proposed, in JP Patent Application 2008-233380, an electric linear motion actuator of which the carrier is axially fixed in position and the outer ring member is used as the output member to linearly drive a driven member.

The electric linear motion actuator disclosed in JP Patent Publication 2007-32717A, of which the carrier is linearly moved as the output member, includes thrust bearings which are disposed in front of the respective planetary rollers with respect to the direction in which the carrier is advanced to linearly drive the driven member, for supporting the rotation of the respective planetary rollers when the planetary rollers are moved linearly together with the carrier.

The electric linear motion actuator disclosed in JP Patent Application 2008-233380, of which the outer ring member is linearly moved as the output member, includes thrust bearings which are disposed in the rear of the respective planetary rollers with respect to the direction in which the outer ring member is advanced to linearly drive the driven member, for supporting the rotation of the respective planetary rollers when the planetary rollers are moved linearly together with the carrier.

Many of vehicle brake assemblies are hydraulic types. But since the introduction of sophisticated brake control systems such as anti-lock brake systems (ABS), electronic disc brake assemblies, which can carry out such brake control without using complicated hydraulic circuits, are gathering attention in recent years.

An electric disc brake assembly disclosed in JP Patent Publication 2007-32717A includes an electric linear motion actuator of the above-described type which is mounted in a caliper body, and an electric motor. When the electric motor is energized in response to a signal indicating e.g. that the brake pedal has been depressed, a brake member as the driven member is pressed against a braked member by the electric motor through the linear motion actuator, thereby braking the braked member.

The electric linear motion actuators disclosed in JP Patent Publication 2007-32717A and JP Patent Application 2008-233380 are both compact in size and ensure a large power increasing function without mounting a separate speed reducer mechanism. While the planetary rollers revolve around the rotary shaft and simultaneously rotate about their respective axes while being supported by the carrier with the helical rib of the outer ring member engaged in the circumferential grooves of the respective planetary rollers, the respective planetary rollers tend to slightly axially shift from one another. This causes external thrust loads applied to the carrier or the outer ring member as the output member to be distributed unevenly to the respective planetary rollers through the respective thrust bearings, which support the rotation of the respective planetary rollers. This may shorten the life of at least some of the planetary rollers.

An object of the present invention is to uniformly distribute external thrust loads to the respective planetary rollers while the planetary rollers are revolving around the rotary shaft while rotating about their respective axes with the helical rib of the outer ring member in engagement with the circumferential grooves of the respective planetary rollers.

SUMMARY OF THE INVENTION

In order to achieve this object, the present invention provides an electric linear motion actuator comprising a housing, an outer ring member mounted in the housing and formed with a helical rib on a radially inner surface of the outer ring member, a rotary shaft mounted coaxially with the outer ring member and configured to be rotated by an electric motor, a carrier supported by the rotary shaft so as to be rotatable about the rotary shaft, a plurality of planetary rollers mounted between a radially outer surface of the rotary shaft and the radially inner surface of the outer ring member and rotatably supported by the carrier, the planetary rollers being in frictional contact with the rotary shaft and each having a plurality of circumferential grooves arranged with the same pitch as the pitch of the helical rib and meshing with the helical rib, the linear motion actuator being configured such that when the rotary shaft rotates, the planetary rollers revolve around the rotary shaft while rotating about axes of the respective planetary rollers due to frictional contact between the planetary rollers and the rotary shaft, and the carrier is moved linearly in an axial direction of the rotary shaft due to meshing engagement between the helical rib and the circumferential grooves, and thrust bearings mounted between an axial surface of the carrier and axial surfaces of the respective planetary rollers that axially face the axial surface of the carrier and configured to receive thrust loads applied from the carrier to the planetary rollers in a push-in direction, wherein the circumferential grooves of the respective planetary rollers are formed such that with the planetary rollers supported by the respective thrust bearings, the axial position of each circumferential groove coincides with the axial position of the portion of the helical rib that is engaged in each of the circumferential grooves.

From another aspect, the present invention provides an electric linear motion actuator comprising a housing, an outer ring member mounted in the housing and formed with a helical rib on a radially inner surface of the outer ring member, a rotary shaft mounted coaxially with the outer ring member and configured to be rotated by an electric motor, a carrier supported by the rotary shaft so as to be rotatable about the rotary shaft, a plurality of planetary rollers mounted between a radially outer surface of the rotary shaft and the radially inner surface of the outer ring member and rotatably supported by the carrier, the planetary rollers being in frictional contact with the rotary shaft and each having a plurality of circumferential grooves arranged with the same pitch as the pitch of the helical rib and meshing with the helical rib, the linear motion actuator being configured such that when the rotary shaft rotates, the planetary rollers revolve around the rotary shaft while rotating about axes of the respective planetary rollers due to frictional contact between the planetary rollers and the rotary shaft, and the outer ring member is moved linearly in an axial direction of the rotary shaft due to meshing engagement between the helical rib and the circumferential grooves, and thrust bearings mounted between an axial surface of the carrier and axial surfaces of the respective planetary rollers that axially face the axial surface of the carrier and configured to receive thrust loads applied from the outer ring member to the planetary rollers in a push-in direction, wherein the circumferential grooves of the respective planetary rollers are formed such that with the planetary rollers supported by the respective thrust bearings, the axial position of each circumferential groove coincides with the axial position of the portion of the helical rib that is engaged in each of the circumferential grooves.

By forming the circumferential grooves of the respective planetary rollers such that with the planetary rollers supported by the respective thrust bearings, the axial position of each circumferential groove coincides with the axial position of the portion of the helical rib that is engaged in each of the circumferential grooves, while the carrier or the outer ring member is linearly driving the driven member, with the planetary rollers revolving around the rotary shaft while rotating about their respective axes due to engagement between the helical rib of the outer ring member and the circumferential grooves, it is possible to uniformly distribute external thrust loads applied to the carrier or the outer ring member to the respective planetary rollers through the thrust bearings, which support their rotation about their axes.

In order to adjust the axial positions of the circumferential grooves in the above manner, the distance from the bearing support surface of each planetary roller on which the thrust bearing is supported to a predetermined reference position of each circumferential groove of each planetary roller may be adjusted so as to be different from the corresponding distances for the other planetary rollers.

If the circumferential grooves are formed on each of the planetary rollers over the entire axial length thereof, and any planetary roller has an incomplete circumferential groove having a rising portion rising from a bottom of the incomplete circumferential groove to the bearing support surface, the incomplete circumferential groove is preferably chamfered to remove the rising portion.

Each planetary roller may have a small-diameter portion located between the bearing support surface and one of the circumferential grooves located nearest to the bearing support surface, of each of the planetary rollers, the small-diameter portions of the respective planetary rollers having different axial lengths from one another, whereby the distances are different from one another. The small-diameter portions have a diameter smaller than the bottom diameter of the circumferential grooves so as not to interfere with the helical rib of the outer ring member.

The axial length of any of the small-diameter portions is preferably not larger than the pitch of the circumferential grooves so as to maximize the radially outer surface of each planetary roller on which the circumferential grooves can be formed.

The small-diameter portions may comprise separate ring members.

In order to adjust the axial positions of the circumferential grooves in the above manner, spacers may be disposed between the races of the respective thrust bearings and the carrier, the spacers having different axial thicknesses from one another.

Each spacer may be integral with one of the race of the thrust bearing and the carrier.

Preferably, the planetary rollers have axial lengths that are equal to one another.

The rotary shaft is preferably rotatably supported by a plurality of axially spaced apart bearings. With this arrangement, the rotary shaft can be extremely stably supported, so that torque of the rotary shaft can be reliably transmitted to the plurality of planetary rollers.

The present invention also provides an electric disc brake assembly comprising an electric linear motion actuator configured to convert a rotary motion of an electric motor to a linear motion and linearly drive a brake pad, thereby pressing the brake pad against a brake disc, wherein the electric linear motion actuator is the electric linear motion actuator according to the present invention. With this arrangement, while the carrier or the outer ring member is being moved linearly, thereby linearly driving the brake pad, with the planetary rollers revolving around the rotary shaft while rotating about their respective axes due to engagement between the helical rib of the outer ring member and the circumferential grooves, it is possible to uniformly distribute external thrust loads applied to the carrier or the outer ring member to the respective planetary rollers.

By forming the circumferential grooves of the respective planetary rollers such that with the planetary rollers supported by the respective thrust bearings, the axial position of each circumferential groove coincides with the axial position of the portion of the helical rib that is engaged in each circumferential groove, while the carrier or the outer ring member is linearly driving the driven member, with the planetary rollers revolving around the rotary shaft while rotating about their respective axes due to engagement between the helical rib of the outer ring member and the circumferential grooves, it is possible to uniformly distribute external thrust loads applied to the carrier or the outer ring member to the respective planetary rollers. This extends the life of the planetary rollers.

The electric disc brake assembly according to the present invention uses the electric linear motion actuator according to the present invention to linearly drive a brake pad, thereby pressing the brake pad against a brake disc. With this arrangement, while the carrier or the outer ring member is linearly driving the driven member, with the planetary rollers revolving around the rotary shaft while rotating about their respective axes due to engagement between the helical rib of the outer ring member and the circumferential grooves, it is possible to uniformly distribute external thrust loads applied to the carrier or the outer ring member to the respective planetary rollers. This extends the life of the planetary rollers.

DETAILED DESCRIPTION OF THE INVENTION

Figure 1:
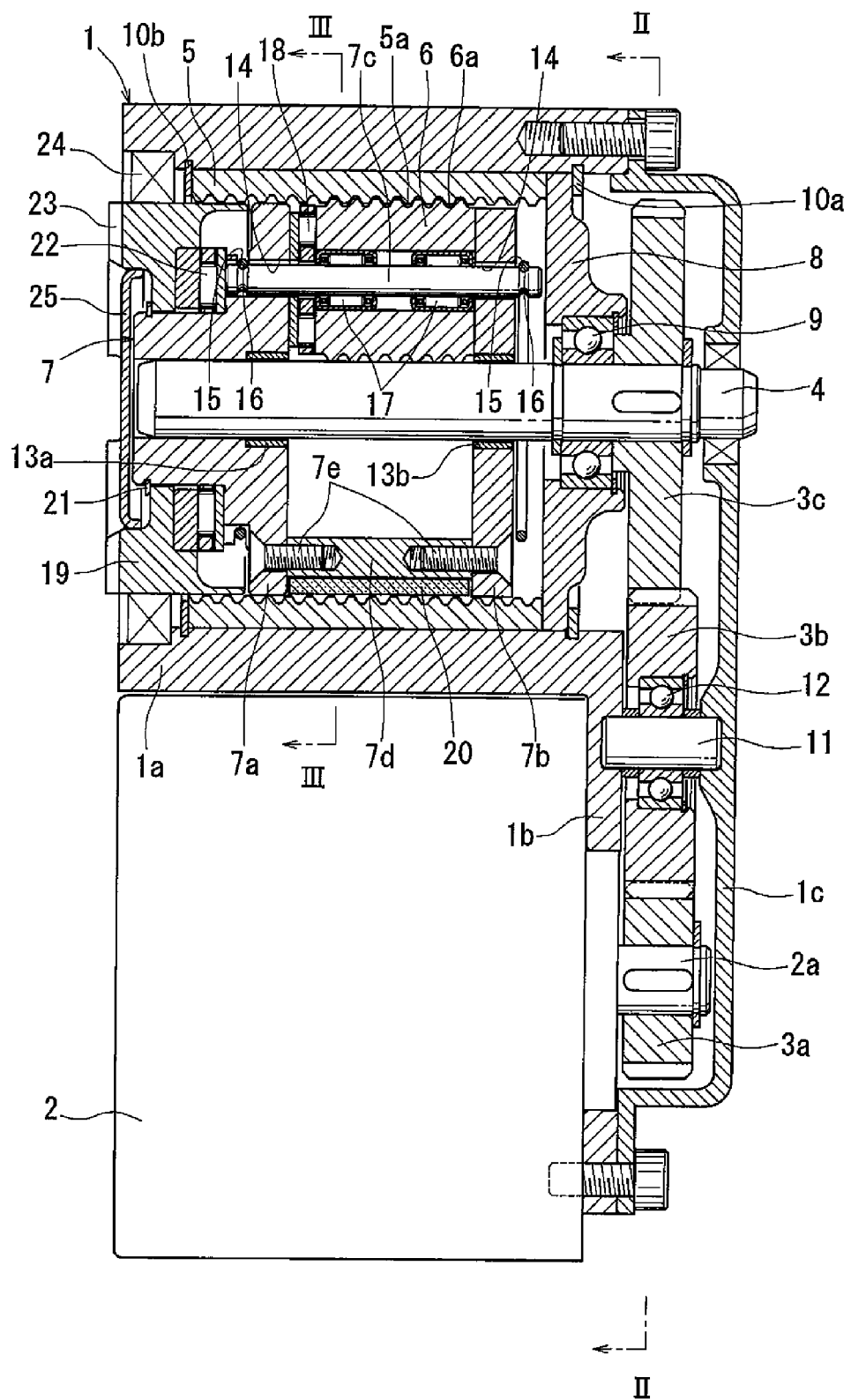
FIG. 1 is a vertical sectional view of an electric linear motion actuator according to a first embodiment of the present invention.
Figure 2:
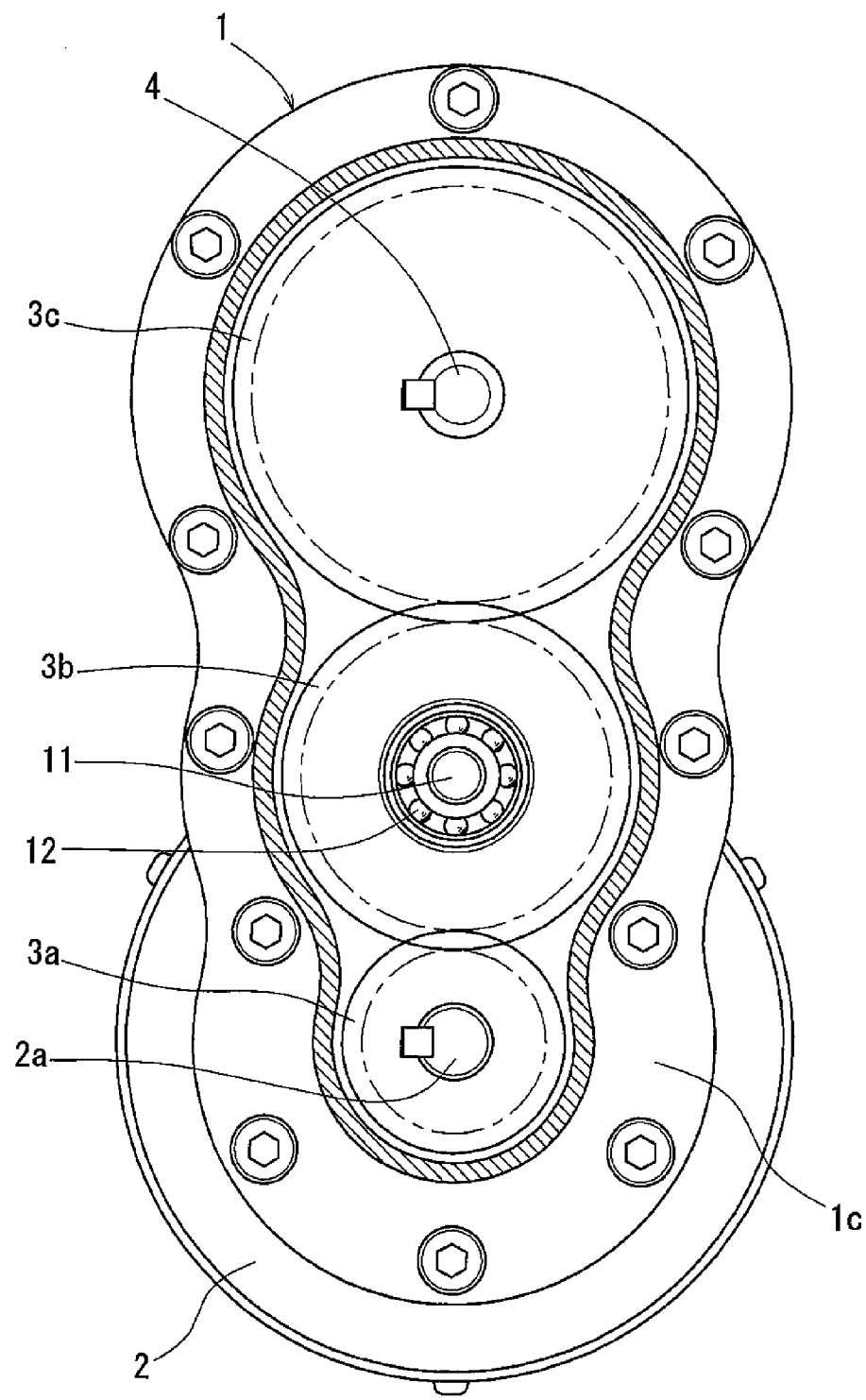
FIG. 2 is a sectional view taken along line II-II of FIG. 1.
Figure 3:
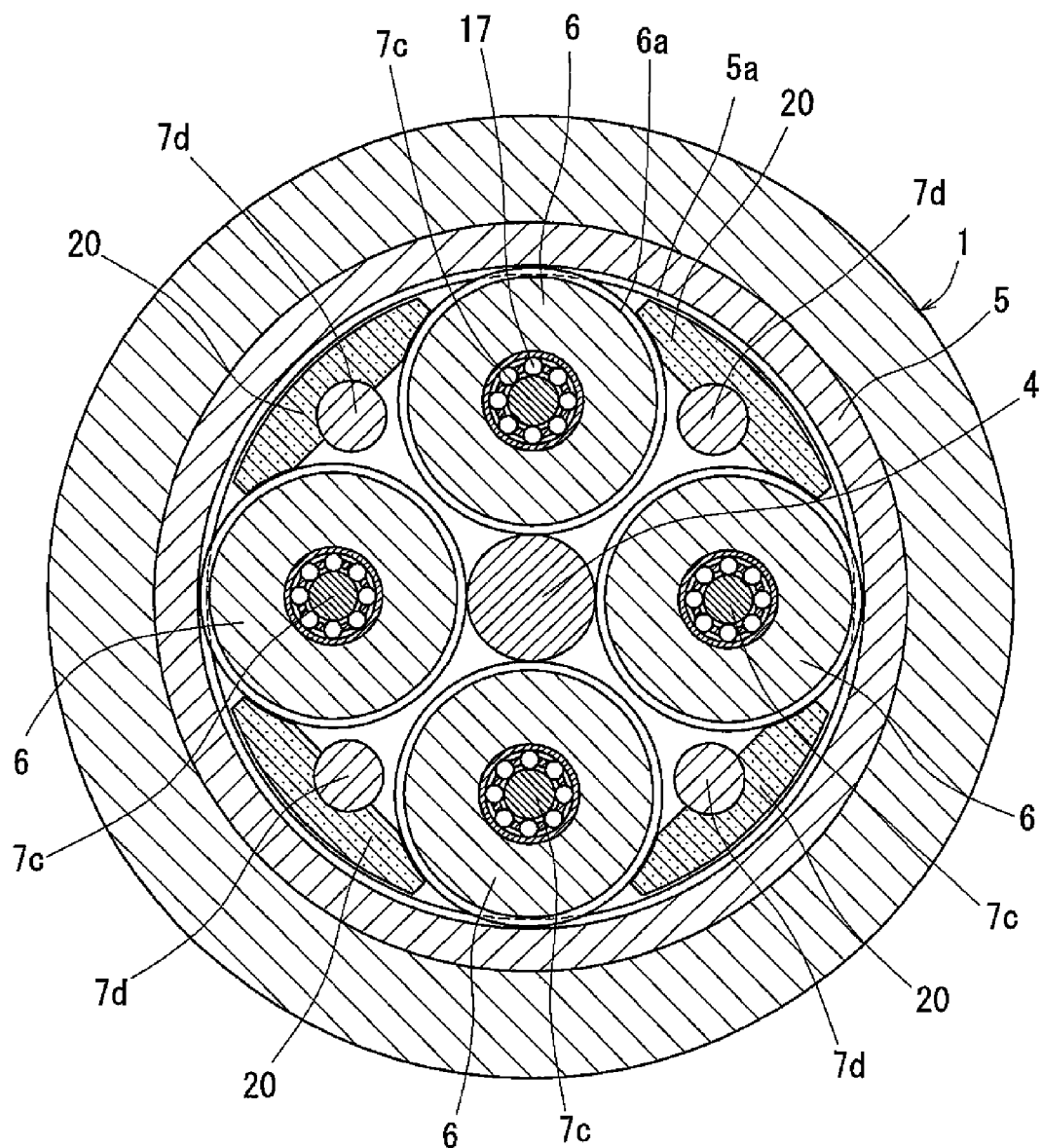
FIG. 3 is a sectional view taken along line III-III of FIG. 1.
Figure 4:
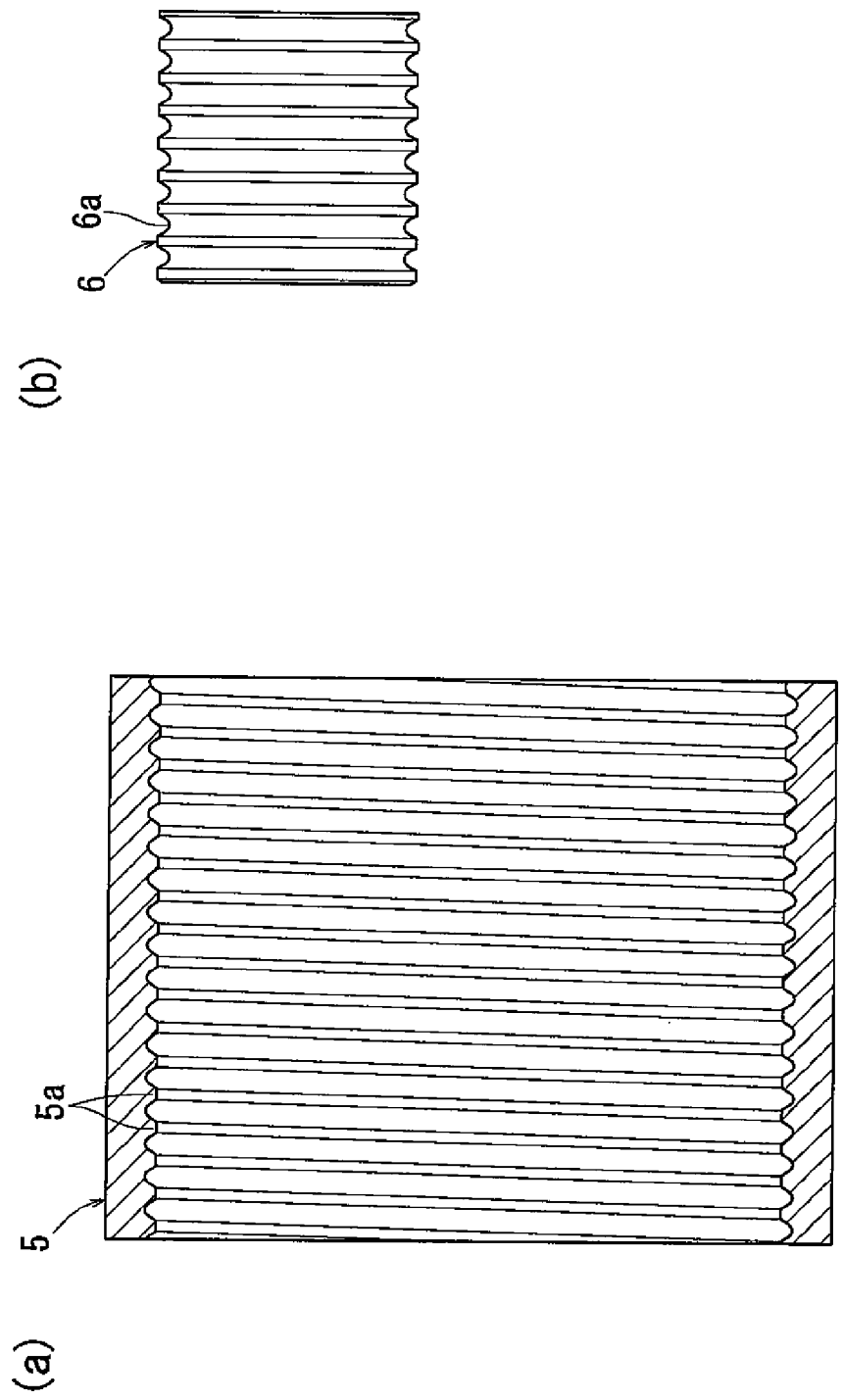
FIG. 4(a) is a vertical sectional view of an outer ring member.
FIG. 4(b) is a front view of a planetary roller.

Now the embodiments of the present invention are described with reference to the drawings. FIGS. 1-6 show the electric linear motion actuator according to the first embodiment of the present invention. As shown in FIGS. 1-4, this actuator includes a housing 1 comprising a cylindrical portion 1a and a flange 1b protruding radially outwardly to one side from one end of the cylindrical portion 1a, and an electric motor 2 mounted to the flange 1b in parallel to the cylindrical portion 1a.

The electric motor 2 has a rotor shaft 2a, whose rotation is transmitted to a rotary shaft 4 coaxial with the cylindrical portion 1a through gears 3a, 3b and 3c. Four planetary rollers 6 are disposed between an outer ring member 5 fixed to the radially inner surface of the cylindrical portion 1a and the rotary shaft 4, and rotatably supported by a carrier 7.

As shown in FIG. 4(a), a helical rib 5a is formed on the radially inner surface of the outer ring member 5. As shown in FIG. 4(b), a plurality of circumferential grooves 6a are formed on the radially outer surface of each planetary roller 6 with the same pitch as the pitch of the helical rib 5a, and are in engagement with the helical rib 5a.

When the rotary shaft 4 rotates, the planetary rollers 6 revolve around the rotary shaft 4 while rotating about the axes of the respective planetary rollers 6 due to frictional contact with the rotary shaft 4. This causes the carrier 7, which supports the planetary rollers 6, and the outer ring member 5 to move axially relative to each other because the helical rib 5a on the radially inner surface of the outer ring member 5 is in engagement with the circumferential grooves 6a on the radially outer surfaces of the respective planetary rollers 6. In this embodiment, the outer ring member 5 is axially fixed in position, so that the carrier 7 is moved axially, thereby linearly driving a member to be driven as an output member.

A lid 1c is mounted to the housing 1 at its end where the flange 1b is provided. The gears 3a, 3b and 3c mesh with each other in the space covered by the lid 1c so as to be located on a plane perpendicular to the axis of the housing.

A shaft support member 8 is mounted in the cylindrical portion 1a near its end where the lid 1c is provided. The rotary shaft 4 has its proximal end portion, where the gear 3c is mounted, supported on the shaft support member 8 through a ball bearing 9. The shaft support member 8 is kept in abutment with the end surface of the outer ring member 5. Snap rings 10a and 10b provided on both sides of the outer ring member 5 prevent axial movement of the outer ring member 5. The snap ring 10a also prevents separation of the shaft support member 8.

The intermediate gear 3b, which meshes with both the gear 3a, which is mounted on the rotor shaft 2a, and the gear 3c, is rotatably mounted on a shaft pin 11 having its ends supported on the flange 1b and the lid 1c, respectively, through a ball bearing 12.

The carrier 7 comprises a carrier body 7a and a support plate 7b which are axially spaced apart from each other and axially slidably and rotatably supported on the rotary shaft 4 through slide bearings 13a and 13b, respectively, support pins 7c each having its ends supported by the carrier body 7a and the support plate 7b, respectively, and each carrying one of the planetary rollers 6, and a plurality of coupling rods 7d through which the carrier body 7a and the support plate 7b are coupled together while being axially aligned with each other. Each coupling rod 7d has its ends coupled to the carrier body 7a and the support plate 7b by means of bolts 7e, respectively. Each support pin 7c has its end portions inserted in radially elongated holes 14 formed in the carrier body 7a and the support plate 7b, respectively, so as to be movable only in the radial direction and not in the circumferential direction.

Each support pin 7c is formed with first and second grooves 15 on its radially outer surface at first and second end portions, respectively. First and second ring springs 16 made of spring steel envelop the support pins 7c in a radially compressed state while being engaged in the first and second grooves 15, respectively, thus pressing planetary rollers 6, which are rotatably supported on the respective support pins 7, against the radially outer surface of the rotary shaft 4. This ensures that the torque of the rotary shaft 4 is stably transmitted to the respective planetary rollers 6.

The planetary rollers 6 are rotatably supported on the support pins 7c of the carrier 7 through needle roller bearings 17 fitted therein, respectively. The planetary rollers 6 are supported on the carrier body 7a through respective thrust roller bearings 18 so as to be rotatable about their axes. When the planetary rollers 6 revolve around the shaft 4, the carrier 7, as an output member, is adapted to rotate together with the planetary rollers 6 while linearly moving. The carrier 7 has a coupling member 19 on its front surface which is coupled to a driven member.

Fan-shaped lubricant applicator members 20 are disposed between the respective adjacent planetary rollers 6 and between the respective coupling rods 7d of the carrier 7 and the radially inner surface of the outer ring member 5.

The coupling member 19 is fitted on the tubular portion of the carrier body 7a and held inseparable therefrom by a snap ring 21. The coupling member 19 is further supported by a thrust roller bearing 22 so as to be rotatable relative to the carrier body 7a. The coupling member 19 has keys 23 on its front end surface through which the coupling member 19 is adapted to be rotationally fixed to the driven member.

An annular seal member 24 provides a seal between the radially outer surface of the coupling member 19 and the cylindrical portion 1a of the housing 1. A film-like seal member 25 covers the end of the rotary shaft 4, which extends through the carrier body 7a, and seals the radially inner portion of the coupling member 19.

When the planetary rollers 6 move linearly in the forward direction relative to the outer ring member 5 at a speed determined by the lead angle (helix angle) of the helical rib 5a, together with the carrier 7 as the output member, and the driven member is also linearly moved in the forward direction by the carrier 7, external thrust loads act on the planetary rollers 6 through the respective thrust roller bearings 18, which are provided in front of the respective planetary rollers 6 with respect to the moving direction of the carrier 7.

Figure 5:
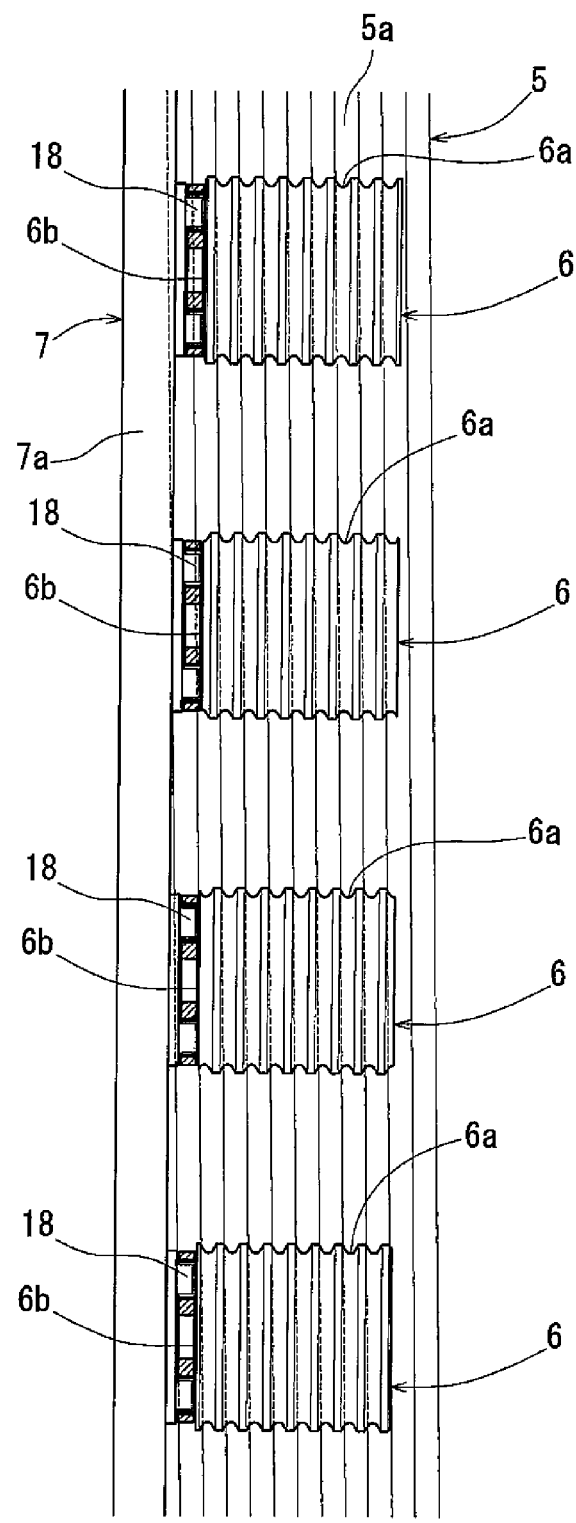
FIG. 5 is a developed view of the outer ring member of FIG. 1 with the planetary rollers in engagement with a helical rib of the outer ring member.

As shown in FIG. 5, a portion of the helical rib 5a that is in engagement with one of the circumferential grooves 6a of each planetary roller 6, which is supported by the corresponding thrust roller bearing 18, is slightly axially offset from portions of the helical rib 5a that are in engagement with respective circumferential grooves 6a of the other planetary rollers 6. In this embodiment, the circumferential grooves 6a of the planetary rollers 6 are formed such that the distance between the bearing support surface 6b of each planetary roller 6 on which the corresponding thrust roller bearing 18 is supported and a predetermined circumferential groove 6a is different from the corresponding distances for the other planetary rollers 6 by the amounts equal to the above slight axial offset amounts of the above-mentioned portions of the helical rib 5a, respectively, so that axial positions of the predetermined circumferential grooves 6a of the respective planetary rollers 6 coincide with the axial positions of the above respective portions of the helical rib 5a. With this arrangement, external thrust loads are uniformly distributed to the respective planetary rollers 6.

FIGS. 6(a) and 6(b) show how the planetary rollers 6 are formed such that the above-mentioned distances of the respective planetary rollers 6 differ from one another. First as shown in FIG. 6(a), a material for a planetary roller 6 is prepared which is formed with circumferential grooves 6a with the same pitch as the helical rib 5a on its radially outer surface over the entire length. A probe ball S is fitted in the complete circumferential groove 6a nearest to the first intended cut position of this planetary roller material, and the planetary roller material is cut at the first intended cut position to form the bearing support surface 6b. The planetary roller material is then cut at the second intended cut position axially spaced from the intended cut position to form one of the planetary rollers 6 including the circumferential groove 6a spaced from the bearing support surface 6b by the distance d. The remaining planetary rollers 6 are formed in the same manner such that the distance (first-groove-distance) d between the first cut position of each planetary roller 6 and the center of the probe ball S differs from the corresponding distances d for the other planetary rollers 6 by the amounts equal to the above axial offset amounts, and further such that the axial dimensions of the respective planetary rollers 6 are identical to one another.

If the incomplete circumferential groove 6a cut at the first or second cut position has a portion rising from its bottom toward the corresponding end surface, the rising portion may be removed to form a chamfer 6c as shown in FIG. 6(b). But such a chamfer 6c may be omitted at one or both of the two ends of each planetary roller.

Figure 6:
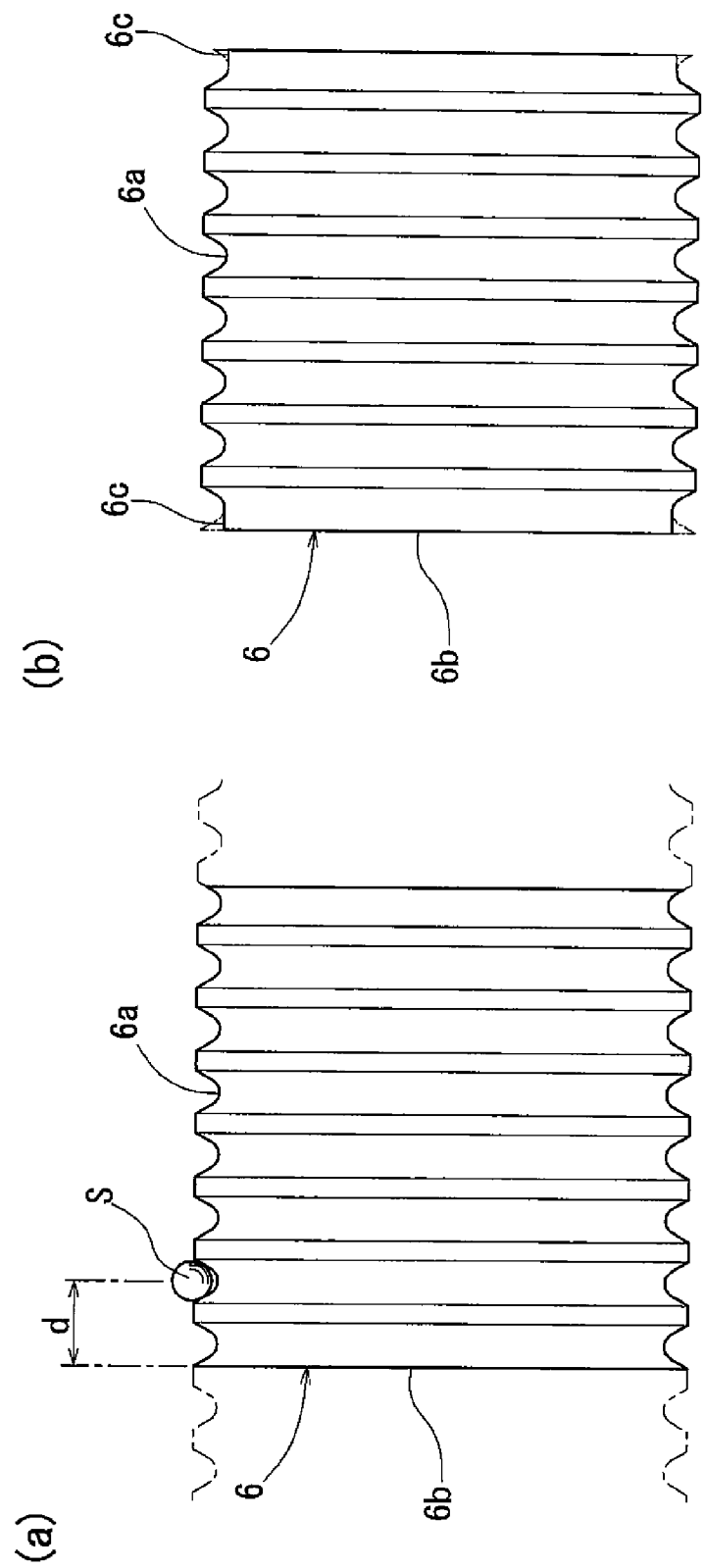
FIGS. 6(a) and 6(b) are front views showing how the planetary roller of FIG. 5 is formed.
Figure 7:
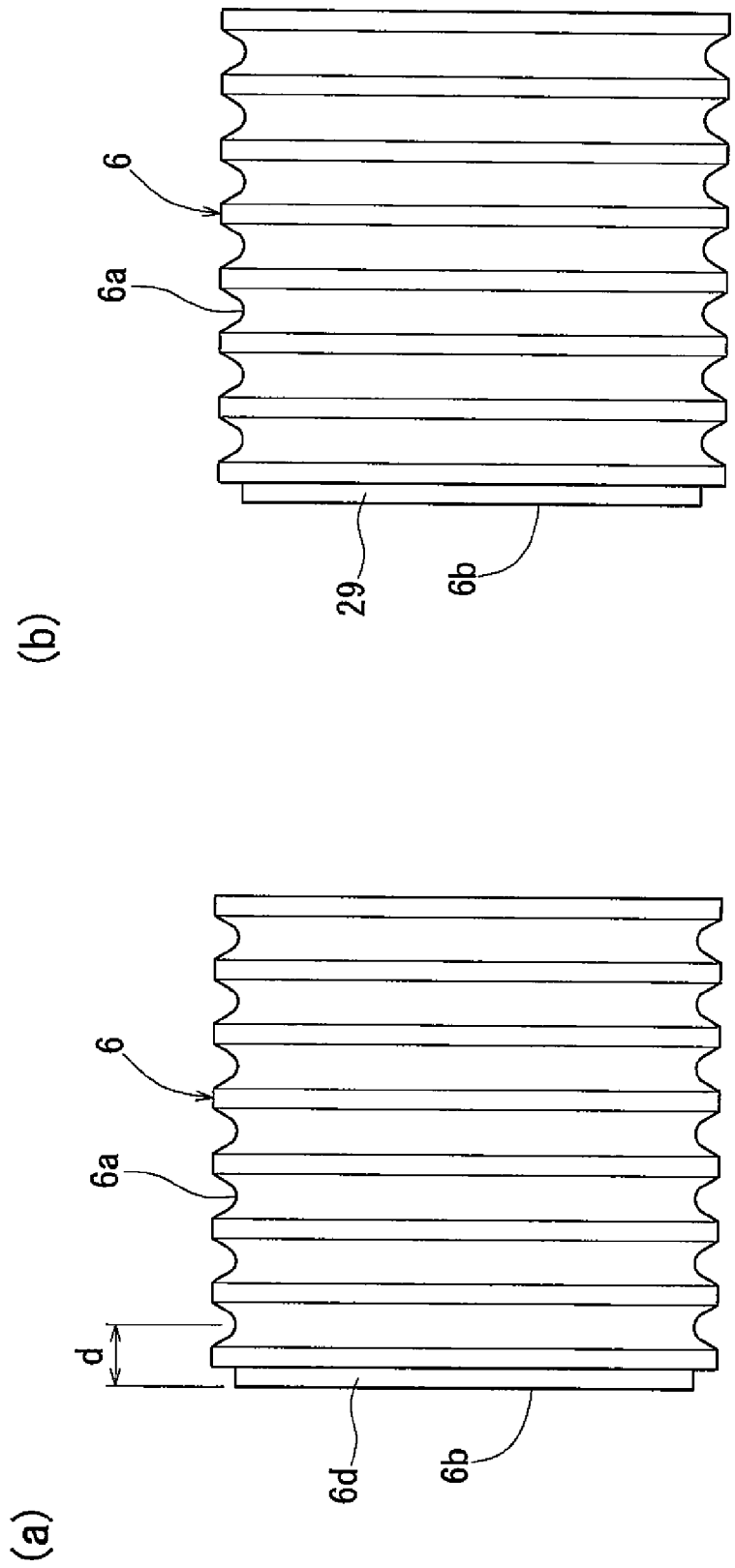
FIGS. 7(a) and 7(b) are front views of a modification of the planetary rollers of FIG. 5.

FIGS. 7(a) and 7(b) show modifications of the planetary rollers 6 of FIGS. 6(a) and 6(b). In the modified example of FIG. 7(a), each planetary roller 6 has, instead of the incomplete circumferential groove 6a interrupted by the bearing support surface 6b, a small-diameter portion 6d having a diameter smaller than the bottom diameter of the circumferential grooves 6a and forming the bearing support surface 6b. The small-diameter portions 6d of the respective planetary rollers 6 have different axial lengths from one another, whereby the distance d between the bearing support surface 6b of each planetary roller 6 and the axial center of the reference circumferential groove 6a, i.e. the groove 6a nearest to the bearing support surface 6b is different from the corresponding distances d for the other planetary rollers 6. The axial lengths of the small-diameter portions 6a are not larger than the pitch of the circumferential grooves 6a. In the modified example of FIG. 7(b), the small-diameter portion 6d of each planetary roller 6 is formed by a separate ring member 29.

In the embodiments of FIGS. 7(a) and 7(b), the axial length of the respective planetary rollers 6, including their small-diameter portions 6d or ring members 29, are slightly different from one another. This poses no problem because no thrust loads are applied to the end surfaces of the respective planetary rollers 6 opposite to the bearing support surfaces 6b and there may exists gaps at this end.

Figure 8:
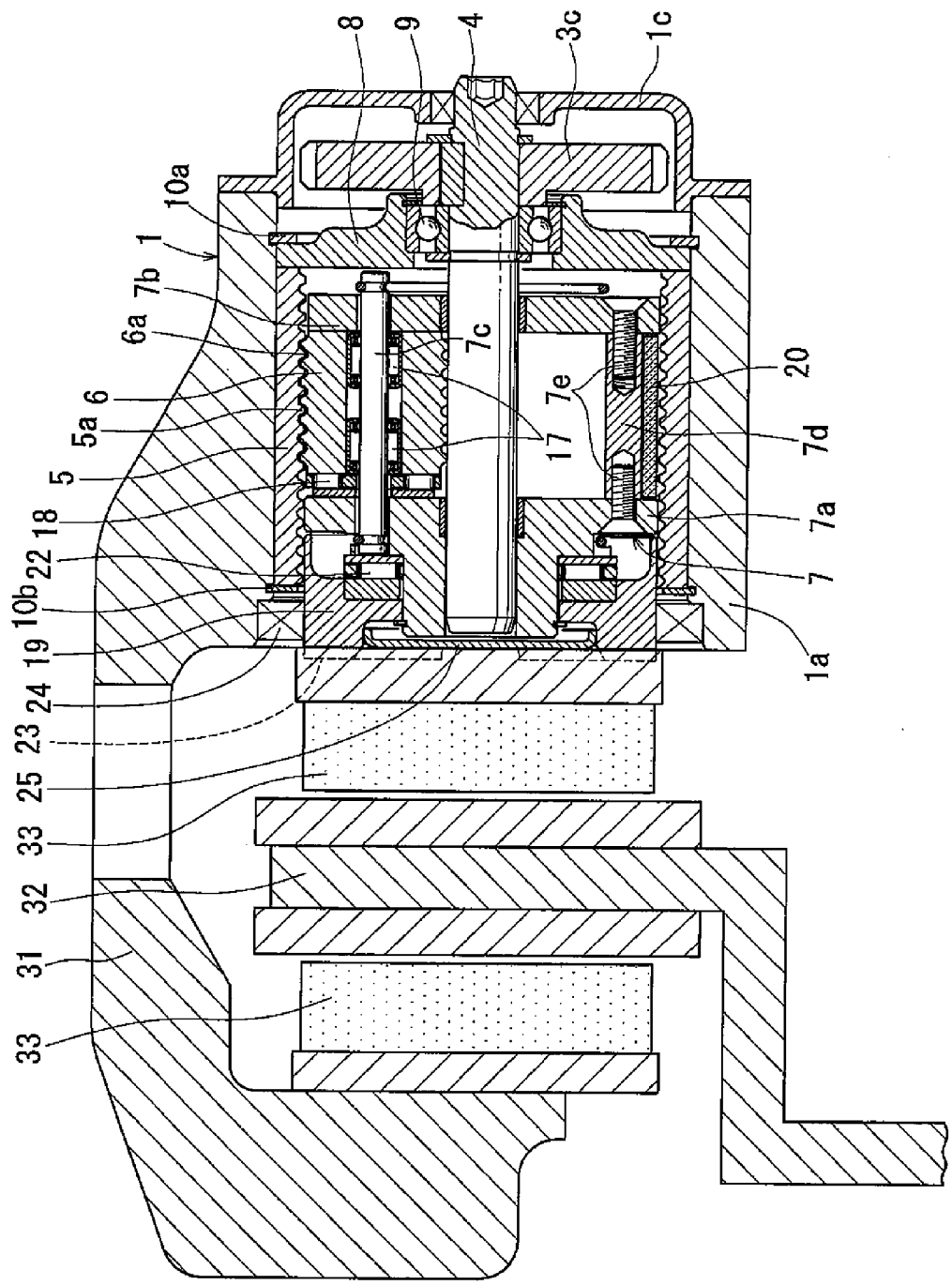
FIG. 8 is a vertical sectional view of an electric disc brake assembly including the electric linear motion actuator of FIG. 1.

FIG. 8 shows an electric disc brake assembly which includes the above-described electric linear motion actuator. This disc brake assembly includes a caliper body 31, a brake disc 32 as a braked member, and brake pads 33 mounted in the caliper body 31 and axially facing each other on both sides of the brake disc 32. The housing 1 of the electric linear motion actuator is fixed to the caliper body 31 disposed therebetween such that when the carrier 7 as the output member moves linearly leftward in FIG. 8, one of the brake pads 33, i.e. a driven member, is moved leftwardly by the carrier 7 through the coupling member 19, whereby the brake pads 33 are pressed against the brake disc 32. FIG. 8 is a sectional view taken along a plane perpendicular to the plane along which the sectional view of FIG. 1 is taken.

Figure 9:
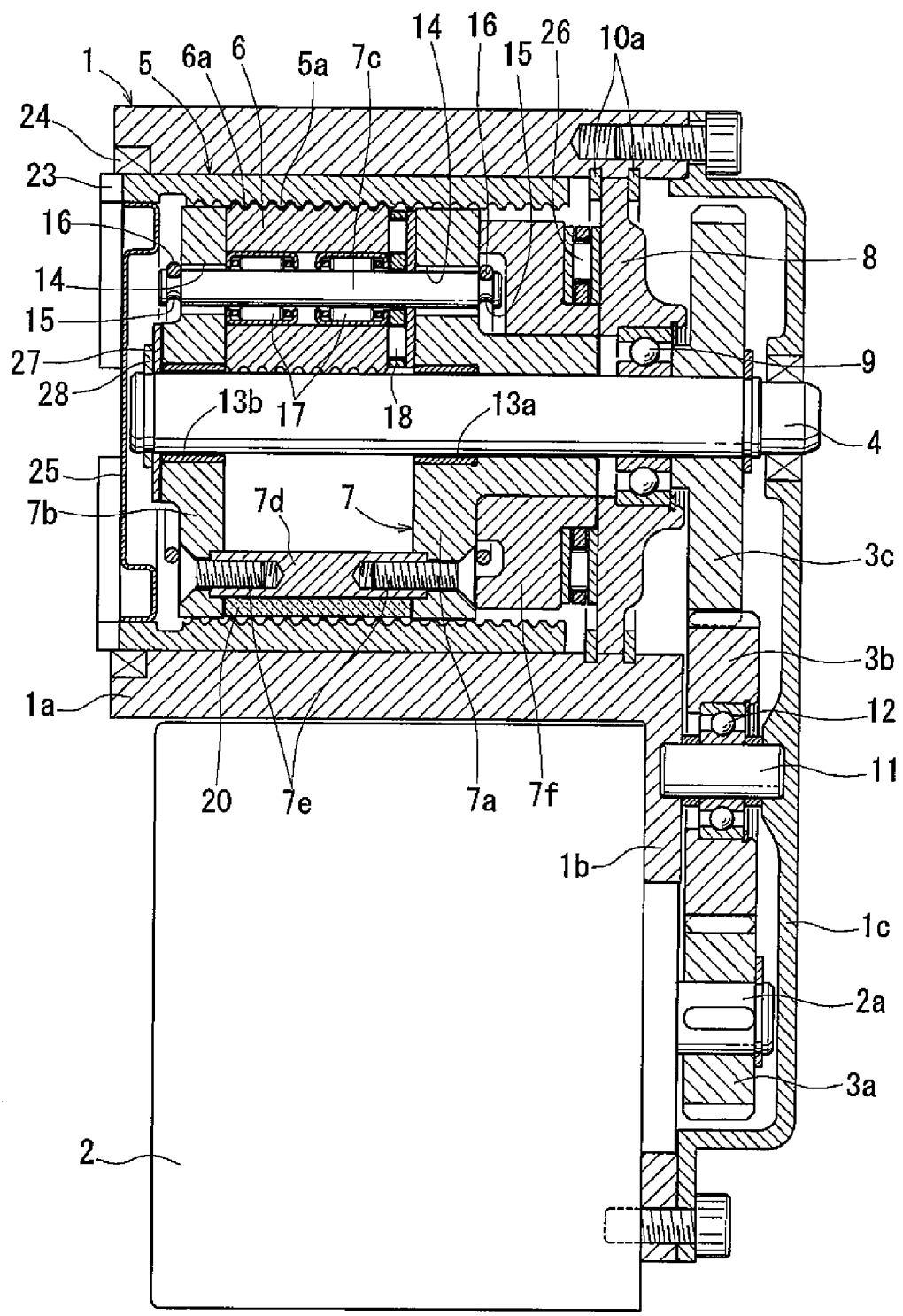
FIG. 9 is a vertical sectional view of an electric linear motion actuator according to a second embodiment of the present invention.
Figure 10:
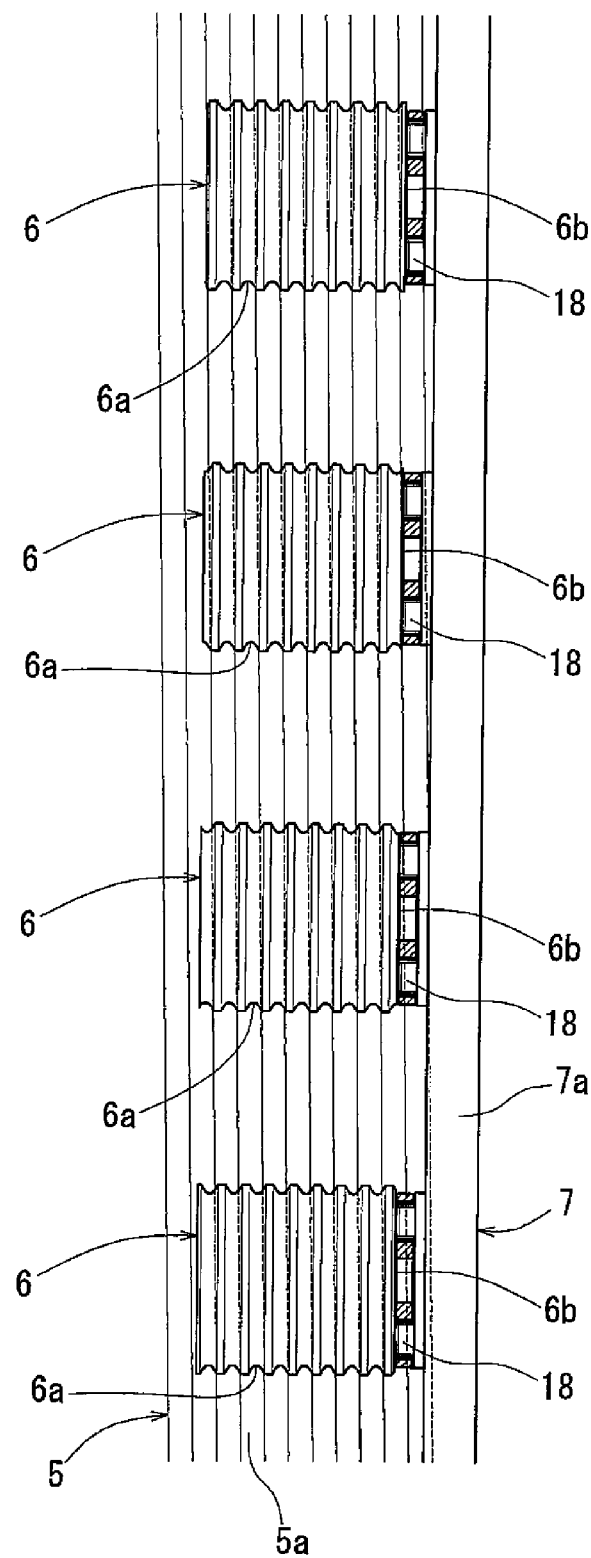
FIG. 10 is a developed view of the outer ring member of FIG. 9 with the planetary rollers in engagement with a helical rib of the outer ring member.

FIGS. 9 and 10 show the electric linear motion actuator according to the second embodiment, which differs from the first embodiment in that the carrier 7 is axially immovable while the outer ring member 5 is axially and linearly movable as the output member. As shown in FIG. 9, the carrier body 7a and the support plate 7b of the carrier 7 are provided on the sides of the planetary rollers opposite to the sides of the planetary rollers where the support plate 7b and the carrier body 7a of the carrier 7 of the first embodiment are provided, respectively. The carrier body 7a is rotatably supported by a shaft support member 8 fitted in the lid 1c, which is secured to the cylindrical portion 1a of the housing 1, by means of a thrust roller bearing 26 through a support member 7f. The shaft support member 8 has both its axial ends fixed in position by snap rings 10a, respectively. A snap ring 28 prevents separation of the support plate 7b from the rotary shaft 4 through a slide bearing 27, thereby preventing axial movement of the carrier 7.

The outer ring member 5 as the output member is slidably mounted in the cylindrical portion 1a of the housing 1 and has keys 23 on its front end surface through which the outer ring member 5 is rotationally fixed to driven member. An annular seal member 24 provides a seal between the radially outer surface of the outer ring member 5 and the cylindrical portion 1a. A film-like seal member 25 covers the end of the rotary shaft 4, which extends through the carrier body 7a, and seals the radially inner portion of the outer ring member 5. In this embodiment, when the outer ring member 5 moves linearly in the forward direction and the driven member is moved in the forward direction by the outer ring member 5, external thrust loads are applied to the planetary rollers 6 through respective thrust roller bearings 18, which are provided at the rear ends of the respective planetary rollers 6 with respect to the moving direction of the outer ring member 5.

As shown in FIG. 10, as with the first embodiment, a portion of the helical rib 5a that is in engagement with one of the circumferential grooves 6a of each planetary roller 6, which is supported by the corresponding thrust roller bearing 18, is slightly axially offset from portions of the helical rib 5a that are in engagement with respective circumferential grooves 6a of the other planetary rollers 6. In this embodiment, in the same manner as shown in FIGS. 6, 7(a) and 7(b), the circumferential grooves 6a of the planetary rollers 6 are formed such that the distance between the bearing support surface 6b of each planetary roller 6 on which the corresponding thrust roller bearing 18 is supported and a predetermined circumferential groove 6a is different from the corresponding distances for the other planetary rollers 6 by the amounts equal to the above slight axial offset amounts of the above-mentioned portions of the helical rib 5a, respectively, so that axial positions of the predetermined circumferential grooves 6a of the respective planetary rollers 6 coincide with the axial positions of the above respective portions of the helical rib 5a.

Figure 11:
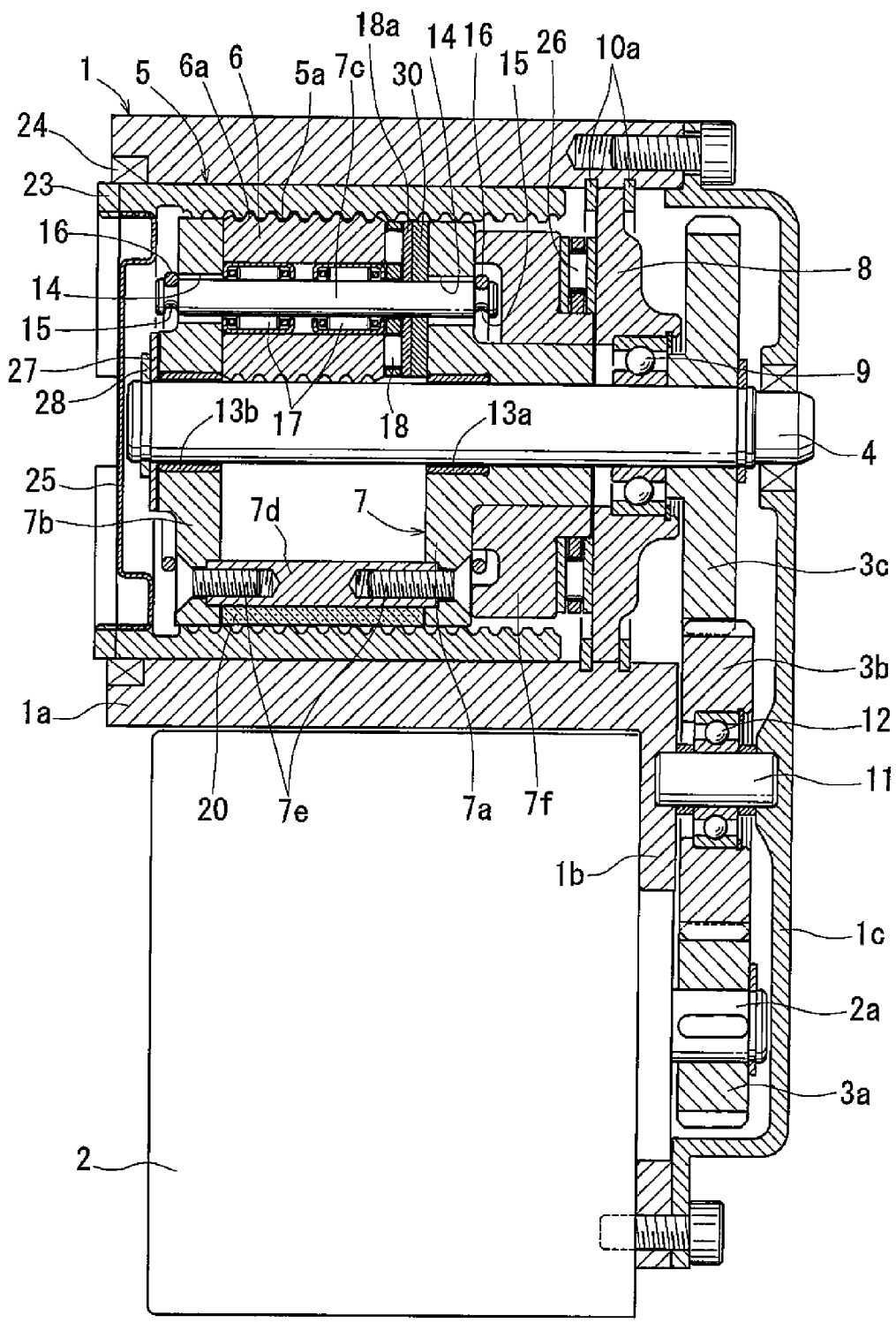
FIG. 11 is a vertical sectional view of an electric linear motion actuator according to a third embodiment of the present invention.
Figure 12:
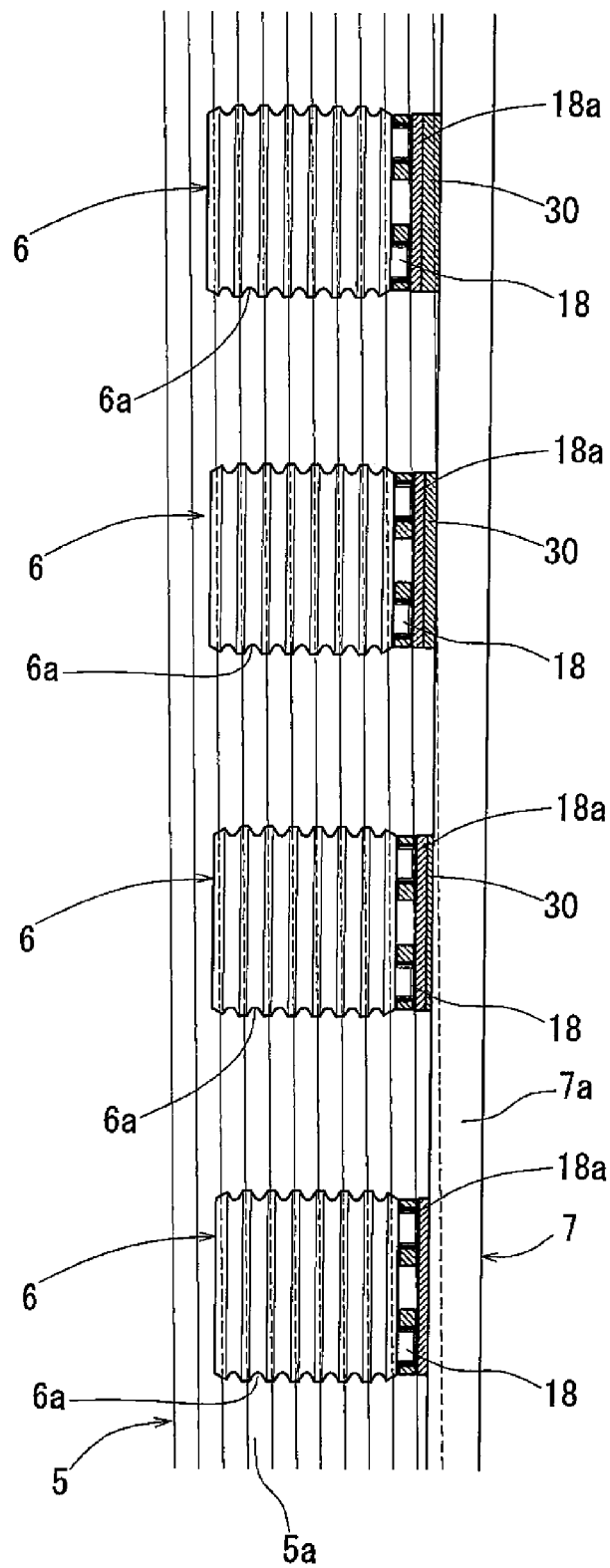
FIG. 12 is a developed view of the outer ring member of FIG. 11 with the planetary rollers in engagement with a helical rib of the outer ring member.

FIGS. 11 and 12 show the electric linear motion actuator according to the third embodiment. This electric linear motion actuator is basically of the same structure as the second embodiment. In this embodiment, in order that the axial position of any circumferential groove 6a of each planetary roller 6 coincides with the axial position of the portion of the helical rib 5a of the outer ring member 5 that is in engagement with this circumferential groove 6a, spacers 30 having different thicknesses from one another are disposed between the races 18a of the respective thrust roller bearings 18, which support the respective planetary rollers 6 so as to be rotatable about their axes, and the carrier body 7a of the carrier 7. The spacers 30 may be integral with the respective races 18a or the carrier body 7a.

In the above embodiments, the helical rib is formed integrally on the radially inner surface of the outer ring member. But instead, the helical rib may comprise a separate helical rib member engaged in a helical groove formed in the radially inner surface of the outer ring member. Four planetary rollers are used in the embodiment. But the number of planetary rollers is not limited to four.

Figure 13:
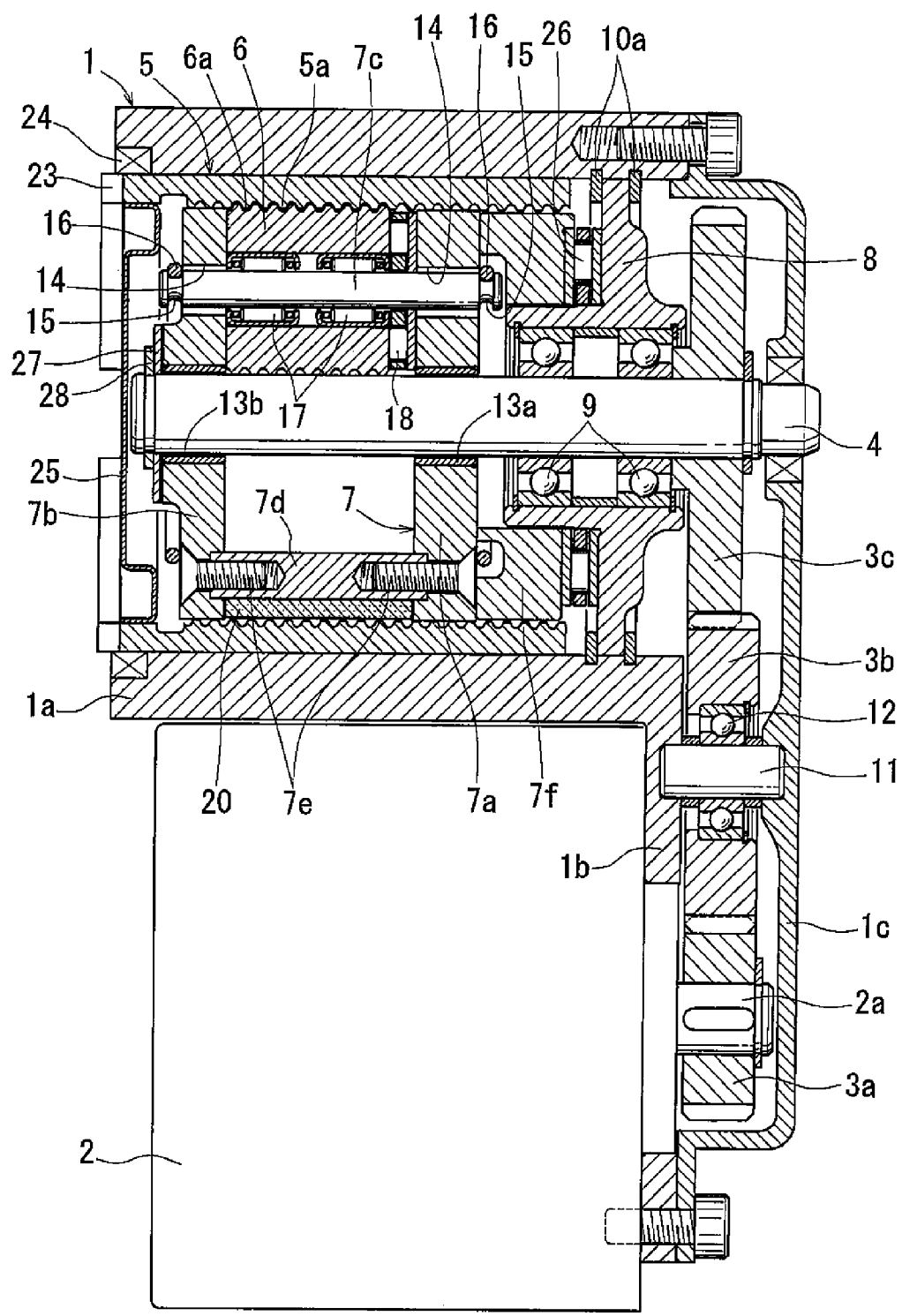
FIG. 13 is a vertical sectional view of an electric linear motion actuator according to a fourth embodiment of the present invention.

FIG. 13 shows the electric linear motion actuator according to the fourth embodiment. This embodiment differs from the second embodiment in that a plurality of axially spaced apart bearings 9 are provided on the bearing support member 8 to rotatably support the rotary shaft 4.

The plurality of bearings 9 may be deep groove ball bearings or angular ball bearings. They may be bearings of the same type or bearings of different type. If angular ball bearings are used as the bearings 9, at least two of them are preferably mounted such that their backs face each other.

By supporting the rotary shaft 4 with a plurality of bearings 9 as in the fourth embodiment, the rotary shaft 4 can be extremely stably supported, so that torque of the rotary shaft 4 can be reliably transmitted to the planetary rollers 6.

Figure 14:
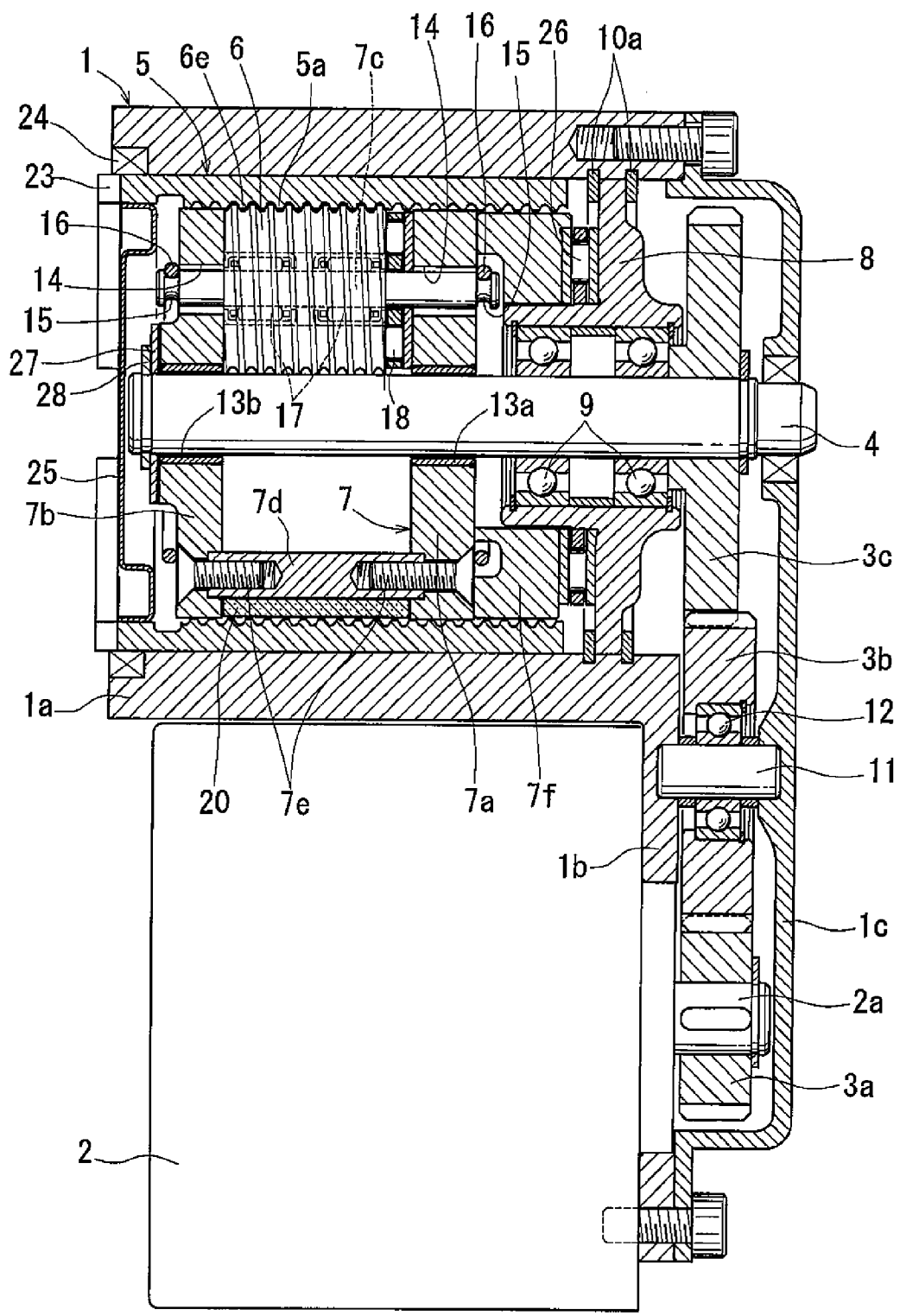
FIG. 14 is a vertical sectional view of a modified electric linear motion actuator.

It is extremely advantageous to support the rotary shaft 4 with a plurality of bearings 9 in the electric linear motion actuator shown in FIG. 14 too.

The electric linear motion actuator shown in FIG. 14 differs from the fourth embodiment in that a helical groove 6e is formed in the radially outer surface of each planetary roller 6 with the same pitch as the helical rib 5a on the radially inner surface of the outer ring member 5 so as to mesh with the helical rib 5a.

In this modified embodiment, elements identical to those of the fourth embodiment are denoted by identical numerals. In this embodiment, when the rotary shaft 4 rotates, the planetary rollers 6, which are in frictional contact with the rotary shaft 4, revolve around the rotary shaft 4 while rotating about their respective axes, so that one of the outer ring member 5, of which the helical rib 5a meshes with the helical ribs 6e of the respective planetary rollers 6, and the carrier 7 moves, as the output member, relative to the other.

Since the rotary shaft 4, which rotates the planetary rollers 6 by frictional contact with the rollers 6, is supported by the plurality of bearings 9, the rotary shaft 6 rotates accurately without inclining, so that torque of the rotary shaft 4 can be reliably transmitted to the planetary rollers 6.

In this embodiment, an additional helical rib 5a may be provided on the outer ring member 5 so as to extend between the other helical rib 5a. In this case, the helical rib 6e of each planetary roller 6 has the same pitch and a different lead angle.

What is claimed is:

1. An electric linear motion actuator comprising:
a housing;
an outer ring member having a center axis and being mounted in the housing and formed with a helical rib on a radially inner surface of the outer ring member, the helical rib having a helical rib pitch;
a rotary shaft mounted coaxially with the outer ring member and configured to be rotated by an electric motor;
a carrier supported by the rotary shaft so as to be rotatable about the rotary shaft;
a plurality of planetary rollers mounted between a radially outer surface of the rotary shaft and the radially inner surface of the outer ring member and rotatably supported by the carrier, each of the planetary rollers having a center axis;
wherein the planetary rollers are in frictional contact with the rotary shaft and each of the planetary rollers has a plurality of circumferential grooves arranged at a groove pitch, the groove pitch constituting a same distance as a distance of the helical rib pitch, and the circumferential grooves of the planetary rollers being in meshing engagement with the helical rib of the outer ring member;

wherein the linear motion actuator is configured such that when the rotary shaft rotates, the planetary rollers revolve around the rotary shaft while rotating about the center axes of the respective planetary rollers due to frictional contact between the planetary rollers and the rotary shaft, and the carrier is moved linearly in an axial direction of the rotary shaft due to meshing engagement between the helical rib and the circumferential grooves;

wherein thrust bearings are mounted between an axially-facing surface of the carrier and axially-facing bearing support surfaces of the respective planetary rollers that axially face the axially-facing surface of the carrier, and the thrust bearings are configured to receive thrust loads applied in a direction from the carrier toward the planetary rollers;

wherein the helical rib of the outer ring member has a helix angle such that the helical rib is inclined relative to a plane perpendicular to the center axis of the outer ring member;

wherein the circumferential grooves of the planetary rollers, respectively, are non-helical such that the circumferential grooves are parallel to the plane perpendicular to the center axis of the outer ring member;

wherein, for each of the planetary rollers, the circumferential grooves include a first circumferential groove which is located closest among the circumferential grooves to the axially-facing bearing support surface;

wherein, for each of the planetary rollers, each of the circumferential grooves has a groove center along an axial direction parallel to the center axis of the planetary roller;

wherein, for each of the planetary rollers, a first-groove-distance is defined by a distance from the axially-facing bearing support surface to the groove center of the first circumferential groove;

wherein the first-groove-distances of the planetary rollers are different from one another, such that the first circumferential grooves of the planetary rollers are axially displaced from one another; and wherein the circumferential grooves of the respective planetary rollers are formed such that the axial position of each circumferential groove coincides with the axial position of the portion of the helical rib that is engaged in said each circumferential groove.

2. An electric linear motion actuator comprising:

a housing, an outer ring member having a center axis and being mounted in the housing and formed with a helical rib on a radially inner surface of the outer ring member, the helical rib having a helical rib pitch;

a rotary shaft mounted coaxially with the outer ring member and configured to be rotated by an electric motor;

a carrier supported by the rotary shaft so as to be rotatable about the rotary shaft;

a plurality of planetary rollers mounted between a radially outer surface of the rotary shaft and the radially inner surface of the outer ring member and rotatably supported by the carrier, each of the planetary rollers having a center axis;

wherein the planetary rollers are in frictional contact with the rotary shaft and each of the planetary rollers has a plurality of circumferential grooves arranged at a groove pitch, the groove pitch constituting a same distance as a distance of the helical rib pitch, and the circumferential grooves of the planetary rollers being in meshing engagement with the helical rib of the outer ring member;

wherein the linear motion actuator is configured such that when the rotary shaft rotates, the planetary rollers revolve around the rotary shaft while rotating about the center axes of the respective planetary rollers due to frictional contact between the planetary rollers and the rotary shaft, and the outer ring member is moved linearly in an axial direction of the rotary shaft due to meshing engagement between the helical rib and the circumferential grooves;

wherein thrust bearings are mounted between an axially-facing surface of the carrier and axially-facing bearing support surfaces of the respective planetary rollers that axially face the axially-facing surface of the carrier, and the thrust bearings are configured to receive thrust loads applied in a direction from the outer ring member toward the planetary rollers;

wherein the helical rib of the outer ring member has a helix angle such that the helical rib is inclined relative to a plane perpendicular to the center axis of the outer ring member;

wherein the circumferential grooves of the planetary rollers, respectively, are non-helical such that the circumferential grooves are parallel to the plane perpendicular to the center axis of the outer ring member;

wherein, for each of the planetary rollers, the circumferential grooves include a first circumferential groove which is located closest among the circumferential grooves to the axially-facing bearing support surface;

wherein, for each of the planetary rollers, each of the circumferential grooves has a groove center along an axial direction parallel to the center axis of the planetary roller;

wherein, for each of the planetary rollers, a first-groove-distance is defined by a distance from the axially-facing bearing support surface to the groove center of the first circumferential groove;

wherein the first-groove-distances of the planetary rollers are different from one another, such that the first circumferential grooves of the planetary rollers are axially displaced from one another; and wherein the circumferential grooves of the respective planetary rollers are formed such that with the planetary rollers supported by the respective thrust bearings, the axial position of each circumferential groove coincides with the axial position of the portion of the helical rib that is engaged in said each circumferential groove.

3. The electric linear motion actuator of claim 1, wherein the first circumferential groove of at least one of the planetary rollers is chamfered at a side thereof closest to the axially-facing bearing support surface of the at least one of the planetary rollers.

4. The electric linear motion actuator of claim 1, wherein for each of the planetary rollers, a small-diameter portion is located between the axially-facing bearing support surface and the first circumferential groove, the small-diameter portion having a diameter smaller than a bottom diameter of the circumferential grooves; and wherein the small-diameter portions of the respective planetary rollers have axial lengths that are different from one another.

5. The electric linear motion actuator of claim 4, wherein, for each of the planetary rollers, the axial length of the small-diameter portion is not larger than the groove pitch of the circumferential grooves.

6. The electric linear motion actuator of claim 5, wherein the small-diameter portions comprise separate ring members.

7. The electric linear motion actuator of claim 1, wherein each of the thrust bearings includes a race;
spacers are disposed between the carrier and the races of the respective thrust bearings; and
the spacers have different axial thicknesses from one another.

8. The electric linear motion actuator of claim 7, wherein the spacers are integral with one of the carrier and the races of the respective thrust bearings.

9. The electric linear motion actuator of claim 1, wherein the planetary rollers have axial lengths that are equal to one another.

10. The electric linear motion actuator of claim 1, wherein the rotary shaft is rotatably supported by a plurality of axially spaced apart bearings.

11. An electric disc brake assembly comprising an electric linear motion actuator configured to convert a rotary motion of an electric motor to a linear motion and linearly drive a brake pad, thereby pressing the brake pad against a brake disc, wherein the electric linear motion actuator is the electric linear motion actuator of claim 1.

12. The electric linear motion actuator of claim 5, wherein the small-diameter portions comprise separate ring members.

13. The electric linear motion actuator of claim 2, wherein each of the thrust bearings includes a race; and
spacers are disposed between the carrier and the races of the respective thrust bearings; and
the spacers have different axial thicknesses from one another.

14. The electric linear motion actuator of claim 2, wherein the planetary rollers have axial lengths that are equal to one another.

15. The electric linear motion actuator of claim 2, wherein the rotary shaft is rotatably supported by a plurality of axially spaced apart bearings.

16. An electric disc brake assembly comprising an electric linear motion actuator configured to convert a rotary motion of an electric motor to a linear motion and linearly drive a brake pad, thereby pressing the brake pad against a brake disc, wherein the electric linear motion actuator is the electric linear motion actuator of claim 2.

* * * * *